(12) United States Patent
Yasuda et al.

(10) Patent No.: US 7,731,434 B2
(45) Date of Patent: Jun. 8, 2010

(54) ACTUATOR AND BLADE DRIVE DEVICE FOR CAMERA

(75) Inventors: Akira Yasuda, Chiba (JP); Shuichi Kawaguchi, Chiba (JP); Akihiro Ito, Chiba (JP); Mikishige Sugasa, Chiba (JP); Shigeru Yanagisawa, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 29 days.

(21) Appl. No.: 12/408,147

(22) Filed: Mar. 20, 2009

(65) Prior Publication Data

US 2009/0180773 A1    Jul. 16, 2009

Related U.S. Application Data

(63) Continuation of application No. PCT/JP2007/074322, filed on Dec. 18, 2007.

(30) Foreign Application Priority Data

Dec. 27, 2006 (JP) .............................. 2006-351572

(51) Int. Cl.
*B03B 9/08* (2006.01)

(52) U.S. Cl. ...................... 396/463; 396/508

(58) Field of Classification Search ................ 396/352, 396/353, 452–456, 463, 467–469, 508
See application file for complete search history.

(56) References Cited

U.S. PATENT DOCUMENTS 6,733,192 B2 * 5/2004 Watanabe .................... 396/463

6,880,988 B2 * 4/2005 Kurosu et al. ............... 396/463
2006/0006968 A1 * 1/2006 Mizumaki .................... 335/272
2008/0240707 A1 * 10/2008 Yasuda et al. ............... 396/463
2009/0148154 A1 * 6/2009 Suzuki et al. ................ 396/463

FOREIGN PATENT DOCUMENTS

| JP | 9-152645 | 6/1997 |
| JP | 10-127033 | 5/1998 |
| JP | 2004-191750 A1 | 7/2004 |
| JP | 2006-113256 A1 | 4/2006 |
| JP | 2006-246556 A1 | 9/2006 |

OTHER PUBLICATIONS

International Search Report for International Application No. PCT/JP07/074322 dated Mar. 5, 2008.

* cited by examiner

*Primary Examiner*—Melissa J Koval
*Assistant Examiner*—Warren K Fenwick
(74) *Attorney, Agent, or Firm*—Kratz, Quintos & Hanson, LLP

(57) ABSTRACT

An electromagnetic actuator includes; a coil for excitation; a stator excited with different magnetic poles by energization of the coil; a rotor magnetized with different magnetic poles in a circumferential direction thereof, and rotated by a magnetic force generated between the rotor and the stator; and an outputting member rotated in conjunction with the rotor and outputting rotational movement of the rotor to a first blade and a second blade. The rotor and the outputting member are jointed by welding and a welding portion of the rotor lies in a boundary of the magnetic poles thereof.

8 Claims, 6 Drawing Sheets

ACTUATOR AND BLADE DRIVE DEVICE FOR CAMERA

CROSS-REFERENCE TO RELATED APPLICATION

This application is a continuation of and claims priority to International Patent Application No. PCT/JP2007/074322 filed on Dec. 18, 2007, which claims priority to Japanese Patent Application No. 2006-351572 filed on Dec. 27, 2006, subject matter of these patent documents is incorporated by reference herein in its entirety.

BACKGROUND OF THE INVENTION

1. Field of the Invention

The present invention relates to an actuator and a blade drive device for a camera.

2. Description of the Related Art

Conventionally, there has been known an actuator used for driving a blade employed in a camera, and composed of a rotor, a stator, a coil for exerting the stator, and an outputting member for transmitting the rotational movement of the rotor to the blade. Japanese Unexamined Patent Application Publication No. 2004-191750 discloses that the rotor and the outputting member are insert-molded.

However, in the case where the rotor and the outputting member are insert-molded, it is difficult to maintain the accuracy of the angular position of the outputting member relative to the rotor.

Further, in the case where the rotor and the outputting member are jointed by welding, the magnetic characteristic of the rotor may be degraded according to the position of the welding.

SUMMARY OF THE INVENTION

It is therefore an object of the present invention to provide an actuator and a blade drive device for a camera in which the degradation of a magnetic characteristic is suppressed and a positional accuracy of an outputting member relative to a rotor is improved.

According to an aspect of the present invention, there is provided an actuator including: a coil for excitation; a stator excited with different magnetic poles by energization of the coil; a rotor magnetized with different magnetic poles in a circumferential direction thereof, and rotated by a magnetic force generated between the rotor and the stator; and an outputting member rotated in conjunction with the rotor and outputting rotational movement of the rotor to a member. The rotor and the outputting member are jointed by welding, and a welding portion of the rotor lies in a boundary of the magnetic poles thereof.

With such a configuration, since the welding portion of the rotor lies in the boundary of the magnetic poles, it is possible to provide an actuator in which the degradation of the magnetic characteristic of the rotor is suppressed and the positional accuracy of the outputting member relative to the rotor is improved.

According to another aspect of the present invention, there is provided a blade drive device for a camera including: a base plate having an aperture; a blade for opening and closing the aperture; and an actuator for driving the blade. The actuator includes: a coil for excitation; a stator excited with different magnetic poles by energization of the coil; a rotor magnetized with different magnetic poles in a circumferential direction, and rotated by a magnetic force generated between the rotor and the stator; and an outputting member rotated in conjunction with the rotor and outputting rotational movement of the rotor to the blade. The rotor and the outputting member are jointed by welding, and a welding portion of the rotor lies in a boundary of the magnetic poles thereof.

With such a configuration, it is possible to provide a blade drive device for a camera with high performance in which the degradation of the magnetic characteristic of the rotor is suppressed and the positional accuracy of the outputting member relative to the rotor is improved.

BRIEF DESCRIPTION OF THE DRAWINGS

Preferred embodiments of the present invention will be described in detail with reference to the following drawings, wherein.

DESCRIPTION OF THE PREFERRED EMBODIMENTS

Figure 1:
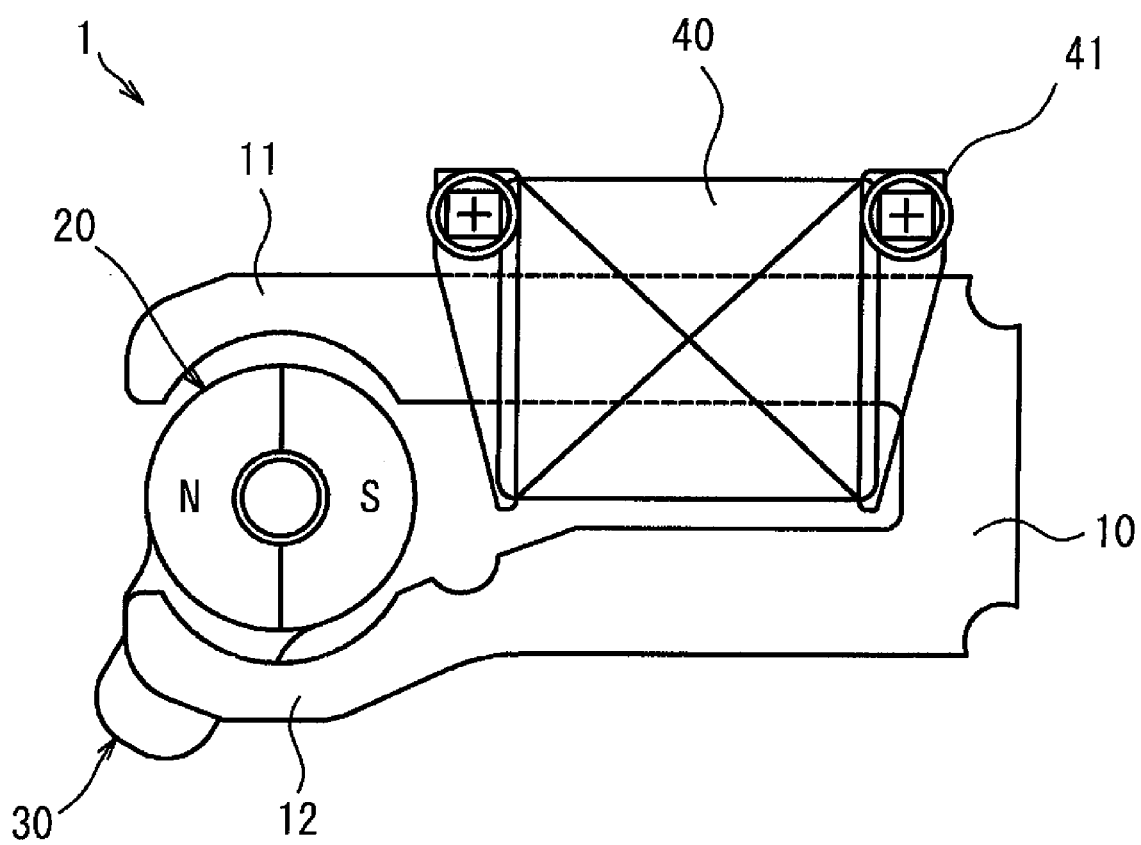
FIG. 1 is a view illustrative of an essential part of an electromagnetic actuator in accordance with a present embodiment.

A description will now be given of embodiments below with reference to drawings. FIG. 1 is a view illustrative of an essential part of an electromagnetic actuator in accordance with a present embodiment.

An electromagnetic actuator 1 includes a stator 10, a rotor 20, an outputting member 30, and a coil 40.

The stator 10 has a U shape, and has a first magnetic pole portion 11 and a second magnetic pole portion 12 at respective ends thereof. The rotor 20 has a cylindrical shape, and two different poles magnetized in the circumferential direction. The coil 40 is wound around a coil bobbin 41. The coil 40 is energized to excite the first magnetic pole portion 11 and the second magnetic pole portion 12 so as to have opposite polarities.

Figure 4:
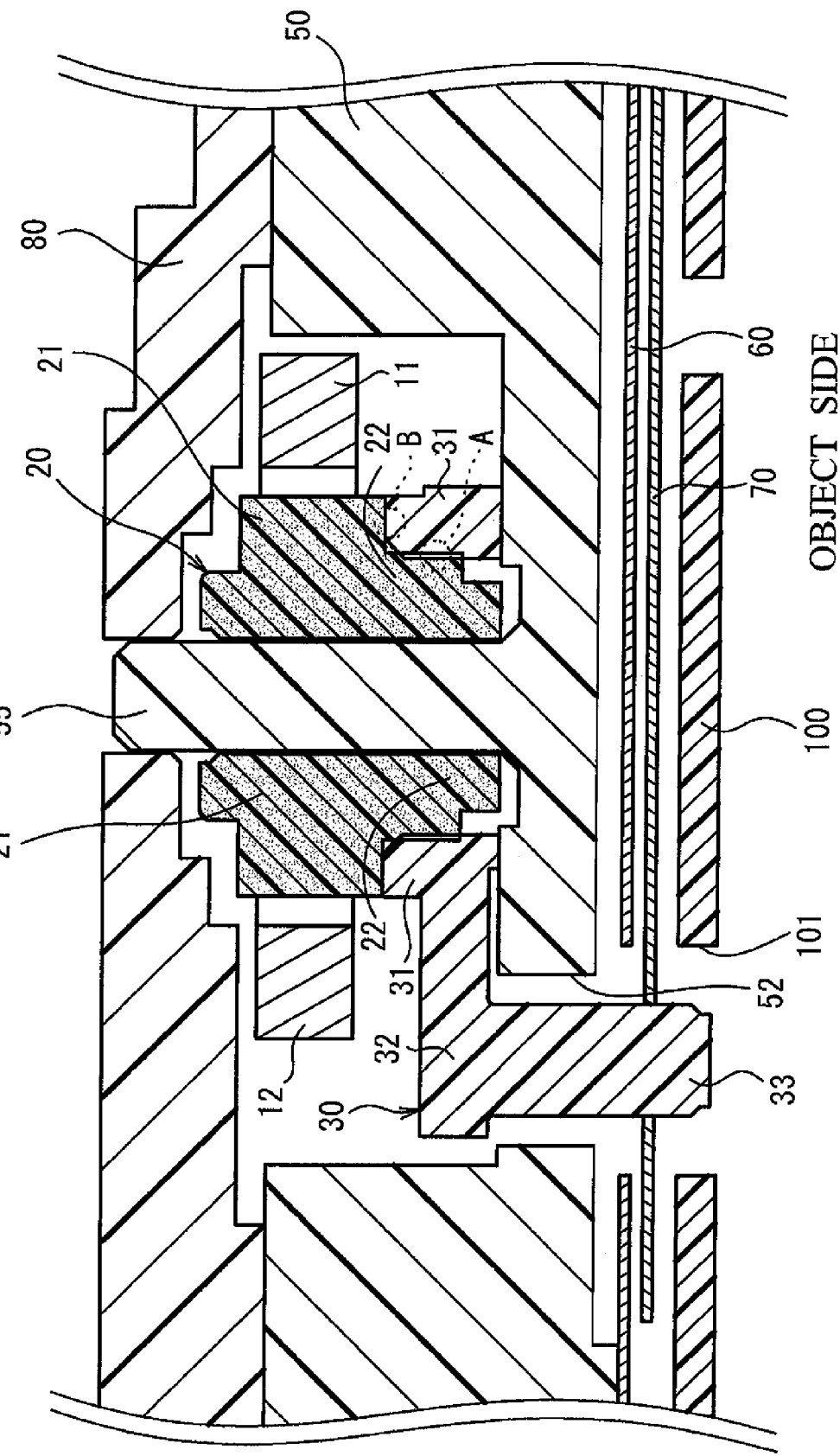
FIG. 4 is a cross-sectional view showing the configuration of the blade drive device for a camera.

The outputting member 30 outputting rotational movement of the rotor 20 is attached to an object side of the rotor 20 (refer to FIG. 4). Therefore, the outputting member 30 swings in conjunction with the rotor 20 within a predetermined rotational range.

The rotor 20 is made of a plastic magnet. Specifically, the rotor 20 is formed by mixing SmFeN magnetic powders and polyamide resin. The outputting member 30 is made of a polyacetal resin which allows the laser beam to pass therethrough. Additionally, any material other than that mentioned above may be used for the rotor 20. For example, NdFeB may be employed as magnetic powders, and a thermoplastic polyphenylene sulfide resin or a polyester resin such as polybutylene terephthalate resin may be employed as a binder resin. Besides, the outputting member 30 may be made of thermoplastics resin such as a polybutylene terephthalate resin, a liquid crystalline polyester resin, a polyphenylene sulfide resin, a polyphenylene sulfide resin, or the like. The outputting member 30 is required to have a color that allows the laser beam to pass therethrough.

Figure 2:
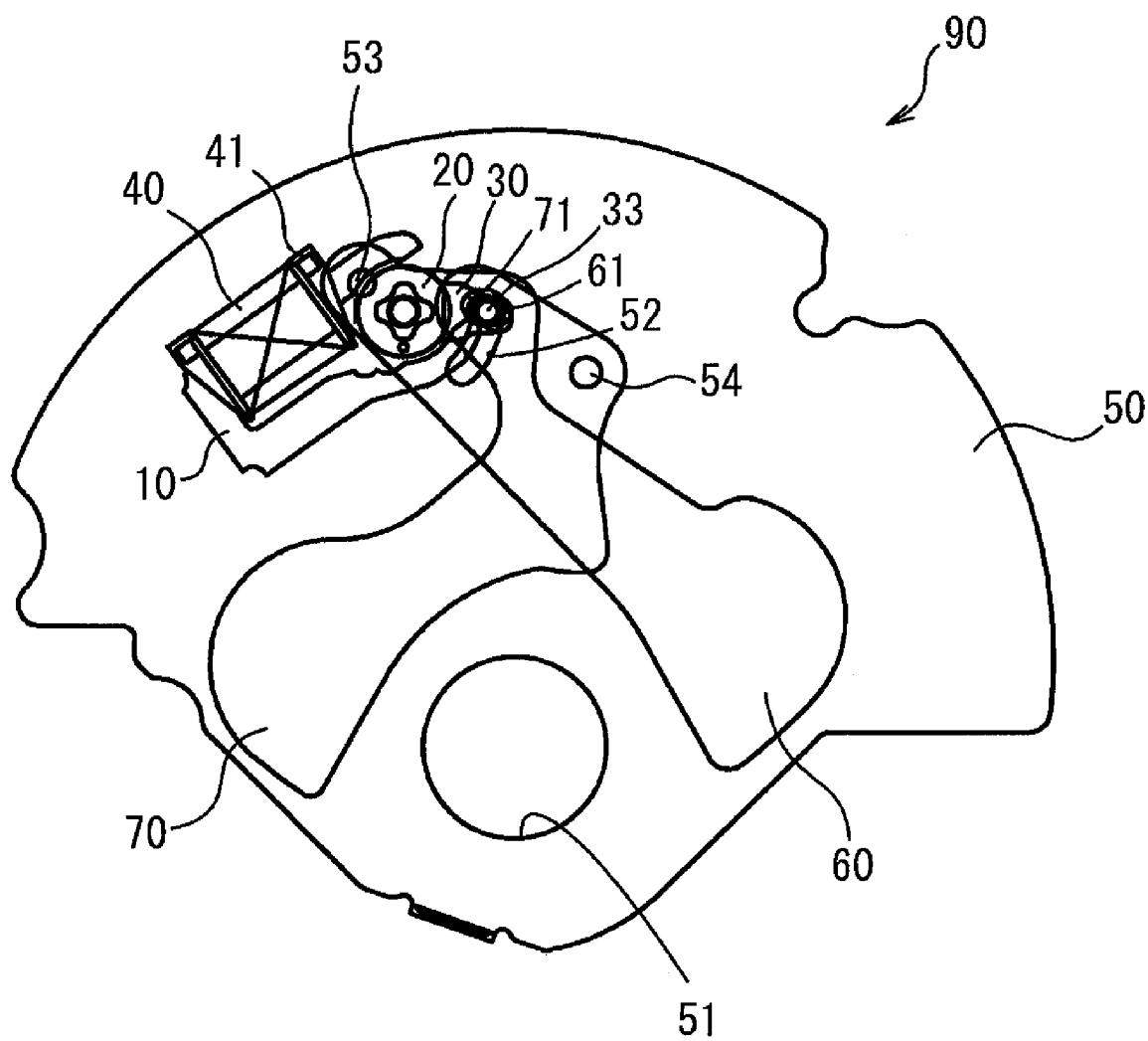
FIG. 2 is a perspective view of a blade drive device for a camera in a fully opened state.
Figure 3:
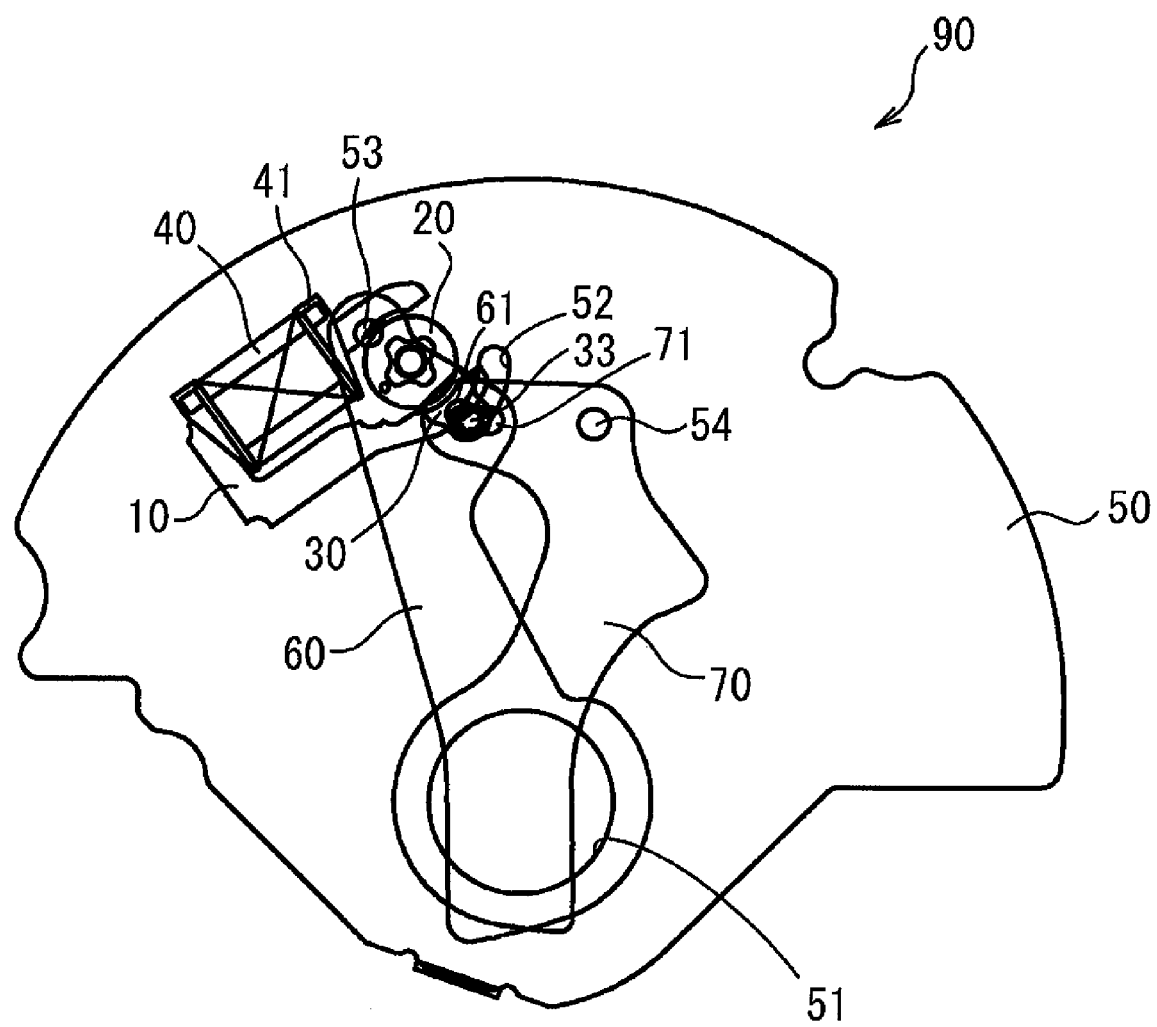
FIG. 3 is a perspective view of the blade drive device for a camera in a fully closed state.

FIGS. 2 and 3 are perspective views of a blade drive device for a camera 90 employing this electromagnetic actuator as a driving source. More specifically, FIG. 2 shows the camera blade drive device 90 in a fully opened state, and FIG. 3 shows the blade drive device for a camera 90 in a fully closed state.

The blade drive device for a camera 90 employing the electromagnetic actuator 1 includes a base plate 50, a first blade 60, and a second blade 70. The base plate 50 has an aperture 51 for shooting. The first blade 60 and the second blade 70 are disposed at a front side in FIGS. 2 and 3. The actuation of the first blade 60 and the second blade 70 changes the aperture 51 into the fully closed state or the fully opened state. The electromagnetic actuator 1 is disposed at the back side of the front side at which the first blade 60 and the second blade 70 are disposed. For this reason, the electromagnetic actuator 1 as shown in FIGS. 2 and 3 and that as shown in FIG. 1 are symmetrical.

The base plate 50 has a receiving slot 52 for receiving the rotation of the outputting member 30. The receiving slot 52 has an arc shape. The outputting member 30 passes through the receiving slot 52 so as to rotate within a predetermined range. That is to say, the receiving slot 52 has a function for controlling the rotational range of the rotor 20.

The first blade 60 and the second blade 70 have a cam slot 61 and a cam slot 71, respectively. The outputting member 30 engages with the cam slots 61 and 71, so that the first blade 60 and the second blade 70 are swung about a spindle 53 and a spindle 54, respectively, formed in the base plate 50. Therefore, the rotational movement of the rotor 20 transmits to the first blade 60 and the second blade 70 via the outputting member 30, and the first blade 60 and the second blade 70 perform the shutter operation.

FIG. 4 is a cross-sectional view showing the configuration of the blade drive device for a camera 90.

A supporting plate 80 is disposed at an image pickup device side of the base plate 50, and supports the electromagnetic actuator 1 between the supporting plate 80 and the base plate 50. A blade supporting plate 100 is disposed at the object side of the base plate 50, and supports the first blade 60 and the second blade 70 between the blade supporting plate 100 and the base plate 50. A spindle 55 is formed in the base plate 50 and extends toward the image pickup device side along the optical axis.

The rotor 20 is rotatably supported on the spindle 55.

The rotor 20 has a large diameter portion 21 and a small diameter portion 22 which differ in their diameter. The large diameter portion 21 is located closer to the image pickup device side, whereas the small diameter portion 22 is located further from the image pickup device side. The large diameter portion 21 faces the first magnetic pole portion 11 and the second magnetic pole portion 12. Thus, the rotor 20 is mainly rotated by the magnetic force generated between the large diameter portion 21, and the first magnetic pole portion 11 and the second magnetic pole portion 12.

A cylindrical portion 31 of the outputting member 30 is press-fitted onto the small diameter portion 22, whereby the outputting member 30 surrounds the rotor 20. A fitting hole is formed in the cylindrical portion 31, and has a slightly smaller diameter than that of the small diameter portion 22.

The outputting member 30 includes an arm 32 and a pin 33. The arm 32 extends radially outwardly from the cylindrical portion 31. The pin 33 extends from a distal end of the arm 32 toward the object side along the optical axis. The pin 33 engages with the cam slots 61 and 71. Additionally, a receiving slot 101 is formed in the blade supporting plate 100 for receiving the swinging of the pin 33.

A method of jointing the rotor 20 and the outputting member 30 will be described below.

Figure 5:
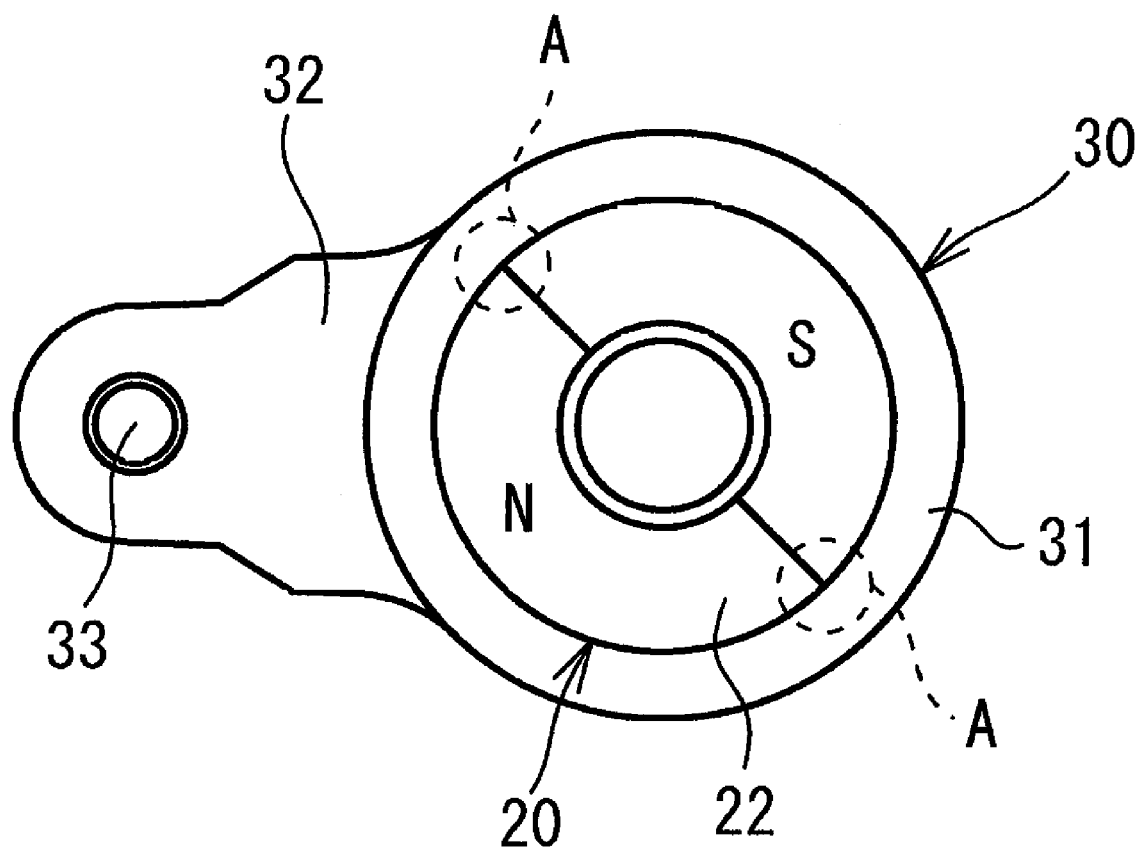
FIG. 5 is an explanatory view showing a welding portion of a rotor and an outputting member.

FIG. 5 is an explanatory view showing a welding portion of the rotor and the outputting member.

Firstly, the outputting member 30 is secured at a predetermined position in such a manner to guide a portion of the outer shape thereof by using a rotor-press-fitting jig. Next, the rotor 20 is positioned at a desired position relative to the outputting member 30 by a magnetic attraction generated between a permanent magnet attached to the rotor-press-fitting jig and the rotor 20 inserted into the rotor-press-fitting jig, and the rotor 20 is press-fitted into the fitting hole of the outputting member 30. After the press fitting, the laser is irradiated to welding portions A shown in FIGS. 4 and 5 and the outputting member 30 and the rotor 20 are jointed with each other.

Herein, the welding portions A lie in the boundaries of the magnetic poles of the rotor 20. In the case where the rotor 20 is made of an isotropic magnet, the position of the boundary of the magnetic poles of the rotor 20 is determined when the rotor 20 is magnetized. In the case where the rotor 20 is made of an anisotropic magnet, the position of the boundary of the magnetic poles of the rotor 20 is determined when the rotor 20 is anisotropically magnetized. The boundary of the magnetic poles may be marked when each process is performed. Additionally, the positions of the boundaries of the magnetic poles may be detected by using a device for detecting the magnetic flux density, so that the detected positions may be marked. The positions of the boundaries of the magnetic poles may be estimated on the basis of the contour of the outputting member 30 press-fitted onto the rotor 20 at a desired angle against the rotor 20.

At the time of laser welding, a laser-irradiated portion of the rotor 20 and a portion close to the laser-irradiated portion of the outputting member 30 are melted by the heat of the laser, thus welding the rotor 20 with the outputting member 30. The thermal shock caused by the heat of the laser, or the shape deformation caused by melting the rotor 20 may degrade the magnetic characteristic of the rotor 20. However, as mentioned above, the laser is irradiated to the boundary of the rotor 20, so that the magnetic pole of the rotor 20 is not entirely melted, thus, restraining the deterioration of the magnetic characteristic of the rotor 20. Additionally, the laser irradiated to the welding portions A may be irradiated to the boundary of the magnetic poles of the rotor 20 from the outside in a radial direction of the rotor 20 and the outputting member 30 to pass through the outputting member 30. Also, as shown in FIG. 4, the laser may be irradiated to a welding portion B in a direction along the axis of the rotor 20 to pass through the outputting member 30.

With such a configuration, since the welding portion of the rotor 20 lies in the boundary of the magnetic poles, the degradation of the magnetic characteristic of the rotor 20 is suppressed and the positional accuracy of the outputting member 30 relative to the rotor 20 is improved.

Additionally, the outputting member 30 and the rotor 20 are jointed by press fitting as well as welding, whereby the jointing of the rotor 20 and the outputting member 30 is strengthened. This makes it possible to be compatible with a case where a load is greatly applied on the outputting member 30, such as a case where a shutter speed is high.

A modification of a method of jointing the rotor 20 and the outputting member 30 will be described below.

Figure 6:
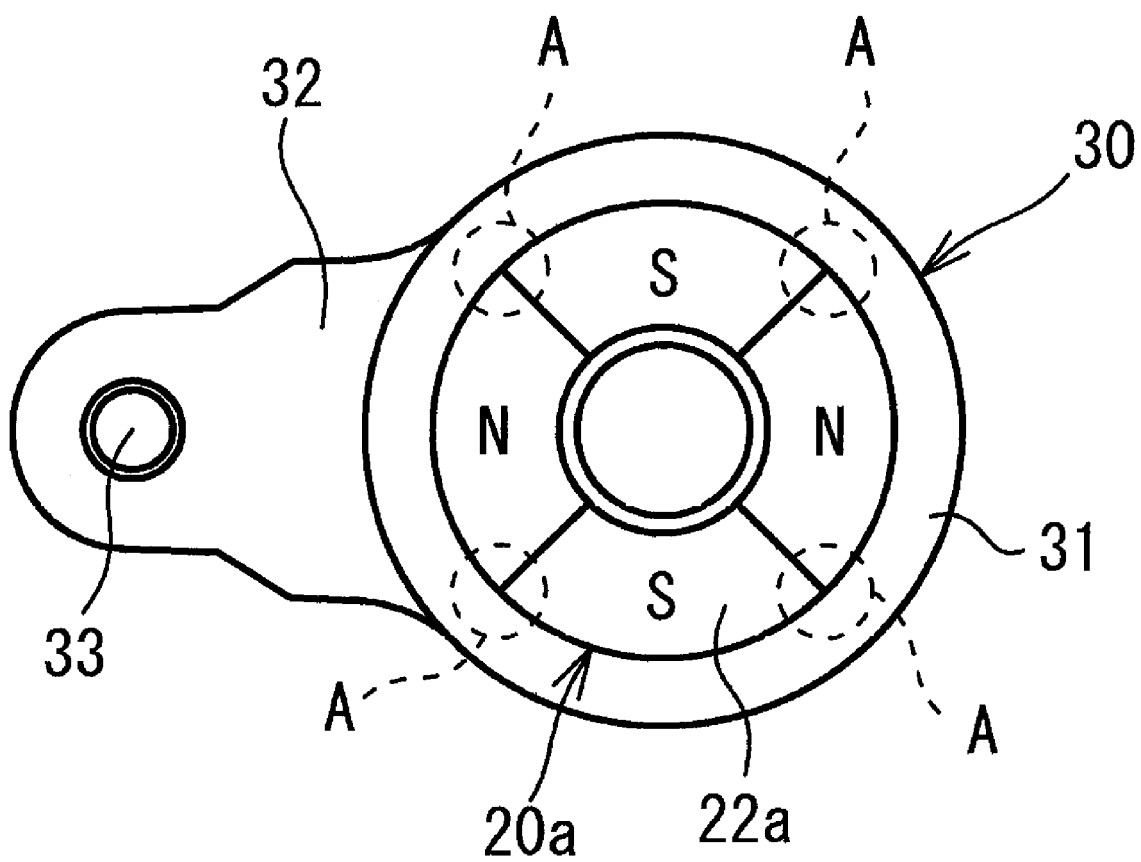
FIG. 6 is an explanatory view showing a welding portion of a rotor and an outputting member according to a modification of the present invention.

FIG. 6 is an explanatory view showing a welding portion of a rotor and an outputting member according to a modification of the present invention.

As shown in FIG. 6, the rotor 20a is magnetized with four magnetic poles in a circumferential direction thereof, and the laser is irradiated to four welding positions serving as the boundaries of the magnetic poles. In this case, since the number of the welding positions is increased as compared with the above case, the outputting member 30 and the rotor 20a are further strongly jointed While the preferred embodiments of the present invention have been illustrated in detail, the present invention is not limited to the above-mentioned embodiments, and other embodiments, variations and modifications may be made without departing from the scope of the present invention.

In the above embodiments, there has been described that there is two welding portions in the case where the rotor 20 is magnetized with the two magnetic poles. There are four welding portions in the case where the rotor 20a is magnetized with the four magnetic poles. However, it is only necessary that at least one weld portion be welded.

Finally, several aspects of the present invention are summarized as follows.

According to an aspect of the present invention, there is provided an actuator including: a coil for excitation; a stator excited with different magnetic poles by energization of the coil; a rotor magnetized with different magnetic poles in a circumferential direction thereof, and rotated by a magnetic force generated between the rotor and the stator; and an outputting member rotated in conjunction with the rotor and outputting rotational movement of the rotor to a member. The rotor and the outputting member are jointed by welding, and a welding portion of the rotor lies in a boundary of the magnetic poles thereof.

With such a configuration, since the welding portion of the rotor lies in the boundary of the magnetic poles, it is possible to provide an actuator in which the degradation of the magnetic characteristic of the rotor is suppressed and the positional accuracy of the outputting member relative to the rotor is improved.

Additionally, a fitting hole formed in the outputting member may be press-fitted onto the rotor.

With such a configuration, the outputting member and the rotor are jointed by press fitting as well as welding, whereby the jointing of the rotor and the outputting member is strengthened.

According to another aspect of the present invention, there is provided a blade drive device for a camera including: a base plate having an aperture; a blade for opening and closing the aperture; and an actuator for driving the blade. The actuator includes: a coil for excitation; a stator excited with different magnetic poles by energization of the coil; a rotor magnetized with different magnetic poles in a circumferential direction, and rotated by a magnetic force generated between the rotor and the stator; and an outputting member rotated in conjunction with the rotor and outputting rotational movement of the rotor to the blade. The rotor and the outputting member are jointed by welding, and a welding portion of the rotor lies in a boundary of the magnetic poles thereof.

With such a configuration, it is possible to provide a blade drive device for a camera with high performance in which the degradation of the magnetic characteristic of the rotor is suppressed and the positional accuracy of the outputting member relative to the rotor is improved.

Additionally, a fitting hole formed in the outputting member may be press-fitted onto the rotor.

With such a configuration, the outputting member and the rotor are jointed by press fitting as well as welding, whereby the jointing of the rotor and the outputting member is strengthened. This makes it possible to be compatible with a case where a load is greatly applied on the outputting member, such as a case where a shutter speed is high.

What is claimed is:

1. An actuator comprising:
a coil for excitation;
a stator excited with different magnetic poles by energization of the coil;
a rotor magnetized with different magnetic poles in a circumferential direction thereof, and rotated by a magnetic force generated between the rotor and the stator; and
an outputting member rotated in conjunction with the rotor and outputting rotational movement of the rotor to a member,
wherein the rotor and the outputting member are jointed by welding, and
a welding portion of the rotor lies in a boundary of the magnetic poles thereof.

2. The actuator of claim 1, wherein a fitting hole formed in the outputting member is press-fitted onto the rotor.

3. The actuator of claim 1, wherein the outputting member surrounds the rotor.

4. The actuator of claim 1, wherein the outputting member is transparent to welding laser light.

5. A blade drive device for a camera comprising:
a base plate having an aperture;
a blade for opening and closing the aperture; and
an actuator for driving the blade,
wherein the actuator includes:
a coil for excitation;
a stator excited with different magnetic poles by energization of the coil;
a rotor magnetized with different magnetic poles in a circumferential direction, and rotated by a magnetic force generated between the rotor and the stator; and
an outputting member rotated in conjunction with the rotor and outputting rotational movement of the rotor to the blade,
wherein the rotor and the outputting member are jointed by welding, and
a welding portion of the rotor lies in a boundary of the magnetic poles thereof.

6. The blade drive device for a camera of claim 5, wherein a fitting hole formed in the outputting member is press-fitted onto the rotor.

7. The blade drive device for a camera of claim 5, wherein the outputting member surrounds the rotor.

8. The blade drive device for a camera of claim 5, wherein the outputting member is transparent to welding laser light.

* * * * *